(12) United States Patent
Koshiba et al.

(10) Patent No.: US 12,181,042 B2
(45) Date of Patent: Dec. 31, 2024

(54) VEHICLE PARK-LOCK CONTROL METHOD AND PARK-LOCK CONTROL DEVICE

(71) Applicant: NISSAN MOTOR CO., LTD., Yokohama (JP)

(72) Inventors: Kenji Koshiba, Kanagawa (JP); Hidehiko Sugita, Kanagawa (JP); Yasuhiro Konishi, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 79 days.

(21) Appl. No.: 17/788,804

(22) PCT Filed: Dec. 26, 2019

(86) PCT No.: PCT/JP2019/051191
§ 371 (c)(1),
(2) Date: Jun. 24, 2022

(87) PCT Pub. No.: WO2021/130974
PCT Pub. Date: Jul. 1, 2021

(65) Prior Publication Data
US 2023/0032865 A1     Feb. 2, 2023

(51) Int. Cl.
*F16H 63/34*     (2006.01)
*F16H 59/08*     (2006.01)
(Continued)

(52) U.S. Cl.
CPC ......... *F16H 63/3458* (2013.01); *F16H 59/08* (2013.01); *B60Q 9/00* (2013.01);
(Continued)

(58) Field of Classification Search
CPC ............... F16H 63/483; F16H 63/3458; F16H 2312/20; F16H 2312/12; F16H 2063/426;
(Continued)

(56) References Cited

U.S. PATENT DOCUMENTS

| 5,919,112 A | 7/1999 | Michael et al. |
| 8,016,719 B2 | 9/2011 | Hecht et al. |

(Continued)

FOREIGN PATENT DOCUMENTS

| CN | 110271519 A | 9/2019 |
| DE | 196 25 019 A1 | 1/1998 |

(Continued)

*Primary Examiner* — Charles A Fox
*Assistant Examiner* — Gregory T Prather
(74) *Attorney, Agent, or Firm* — Foley & Lardner LLP

(57) ABSTRACT

A vehicle park lock control method is presented with range positions including a P-range position and an N-range position in each of which a driving force is prevented from being transmitted to a driving wheel of a vehicle. A park lock mechanism is activated when in the P-range position. An operator is allowed to select whether or not to cause the park lock mechanism to be activated in response to key-off operation when in the N-range position. In response to continuous shifting of a range selector to one or more specific ones of the range positions, the park lock mechanism is prevented from being activated in response to key-off operation when in the N-range position.

5 Claims, 8 Drawing Sheets

(51) Int. Cl.
*B60Q 9/00* (2006.01)
*F16H 59/02* (2006.01)
*F16H 63/42* (2006.01)
*F16H 63/48* (2006.01)

(52) U.S. Cl.
CPC ............... *F16H 2059/0221* (2013.01); *F16H 2063/426* (2013.01); *F16H 63/483* (2013.01); *F16H 2312/12* (2013.01); *F16H 2312/20* (2013.01)

(58) Field of Classification Search
CPC ..... F16H 2059/0221; F16H 2059/0295; F16H 59/08
See application file for complete search history.

(56) References Cited

U.S. PATENT DOCUMENTS

| | | | |
|---|---|---|---|
| 8,521,378 B2 | 8/2013 | Steinhauser et al. | |
| 8,897,978 B2 | 11/2014 | Fyie et al. | |
| 9,726,284 B2 * | 8/2017 | Adams, Jr. | F16H 63/3491 |
| 10,024,431 B2 | 7/2018 | Parker, Jr. et al. | |
| 11,384,832 B1 * | 7/2022 | Bakalas | F16H 59/08 |
| 2009/0111649 A1 | 4/2009 | Hecht et al. | |
| 2010/0206118 A1 | 8/2010 | Nagashima et al. | |
| 2011/0087386 A1 | 4/2011 | Steinhauser et al. | |
| 2012/0285284 A1 * | 11/2012 | Wang | F16H 59/10 74/473.3 |
| 2013/0151095 A1 | 6/2013 | Fyie et al. | |
| 2013/0151097 A1 * | 6/2013 | Deurloo | F16H 61/16 701/62 |
| 2015/0135878 A1 * | 5/2015 | Park | F16H 59/0278 74/473.24 |
| 2016/0186859 A1 | 6/2016 | Parker et al. | |
| 2018/0058579 A1 * | 3/2018 | Khan | B60K 20/02 |

FOREIGN PATENT DOCUMENTS

| | | |
|---|---|---|
| DE | 10 2007 000 558 B3 | 6/2009 |
| DE | 10 2012 222 183 A1 | 6/2013 |
| JP | 2004-324849 A | 11/2004 |
| JP | 2010-190311 A | 9/2010 |
| JP | 2019-070394 A | 5/2019 |
| WO | WO-2009/027163 A1 | 3/2009 |
| WO | WO-2015/016109 A1 | 2/2015 |

* cited by examiner

VEHICLE PARK-LOCK CONTROL METHOD AND PARK-LOCK CONTROL DEVICE

TECHNICAL FIELD

The present invention relates to control of a park lock mechanism that locks at least one road wheel of a vehicle when the vehicle is parked.

BACKGROUND ART

In general, a vehicle, such as a vehicle equipped with an automatic transmission or an electric vehicle, is provided with a park lock mechanism, wherein when the vehicle is stopped, and a P-range (parking range) is selected by a range selector, the park lock mechanism operates to lock a road wheel so as to prevent the vehicle from moving.

On the other hand, a patent document 1 discloses an art in which in a situation where a vehicle is stopped, an N-range (neutral range) is selected, and a driver performs key-off operation (turning off an ignition switch) with the N-range selected, a park lock mechanism is activated by shifting into a P-range substantially by an internal mechanism.

The activation of the park lock mechanism in response to the key-off operation even when in the N-range position is effective in preventing the vehicle from unintentionally moving while the vehicle is parked and the driver is apart from the vehicle. However, if the activation of the park lock mechanism in response to the key-off operation when in the N-range position always occurs, it may be inconvenient. For example, in the absence of the driver, it becomes impossible for a person to push and move the vehicle a little for parking space adjustment.

PRIOR ART DOCUMENT(S)

Patent Document(s)

Patent Document 1: Japanese Patent Application Publication No. 2004-324849

SUMMARY OF INVENTION

According to the present invention, a vehicle park lock control method with range positions including a P-range position and an N-range position in each of which a driving force is prevented from being transmitted to a driving wheel of a vehicle, wherein a park lock mechanism is activated when in the P-range position, the vehicle park lock control method includes: allowing an operator to select whether or not to cause the park lock mechanism to be activated in response to key-off operation when in the N-range position.

Thereby, it is possible to reliably restrict movement of the vehicle by activating the park lock mechanism when the vehicle is parked in the N-range position, or park the vehicle without activation of the park lock mechanism, as appropriate.

MODE(S) FOR CARRYING OUT INVENTION

The following describes an embodiment of the present invention in detail with reference to the drawings.

Figure 1:
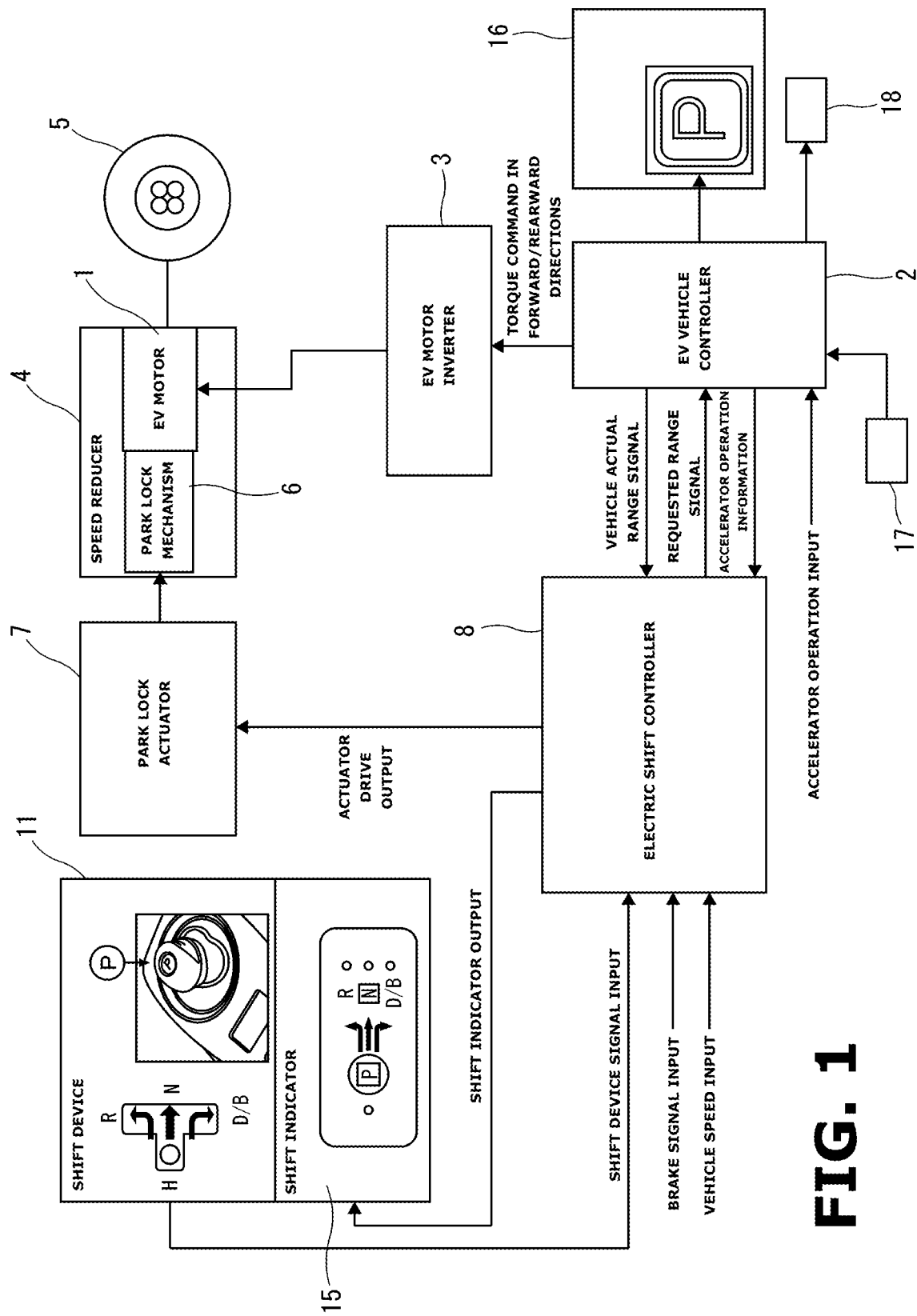
FIG. 1 is an explanatory diagram showing system configuration of a vehicle park lock control device according to the present invention.

FIG. 1 is an explanatory diagram showing system configuration of a park lock control device according to the present invention. In this embodiment, a vehicle is an electric vehicle provided with an EV motor 1 as a drive source, wherein the EV motor 1 is a motor generator, and wherein driving of the EV motor 1 is controlled via an inverter 3 based on a torque command (torque command in forward/backward directions) outputted by a vehicle controller 2. For calculation of the torque command, the vehicle controller 2 receives input of at least a driver's accelerator operation input (for example, an opening of an accelerator pedal depressed). The EV motor 1 outputs a torque that is transmitted to driving wheels 5 via a speed reducer 4. In the shown example, the speed reducer 4 is configured to transmit rotation of the EV motor 1 to the driving wheels 5 while simply causing speed reduction via a gear train. However, the speed reducer 4 may include a stepwise or continuously variable transmission.

The speed reducer 4 is provided with a publicly known park lock mechanism 6 for locking the driving wheels 5 from rotating. Although not shown in detail, the park lock mechanism 6 includes: a parking gear not shown inside the speed reducer 4, which rotates integrally with the drive wheel 5; a parking rod not shown that is moved forward and backward by operation of a park lock actuator 7 of an electric type; and a parking pole not shown that swings and meshes with the parking gear as the parking rod moves forward and backward. When the park lock mechanism 6 is in an activated state (in a lock position), the driving wheel 5 is locked from rotating by engagement between the parking gear and the parking pole. For example, the park lock actuator 7 is configured to be rotated by a certain angle by operation of an electric motor, wherein the parking rod moves forward and backward in accordance with the rotational position of the park lock actuator 7, so as to switch between engagement and disengagement of the park lock pole with respect to the park lock gear. The park lock actuator 7 is controlled by a shift controller 8.

Figure 2:
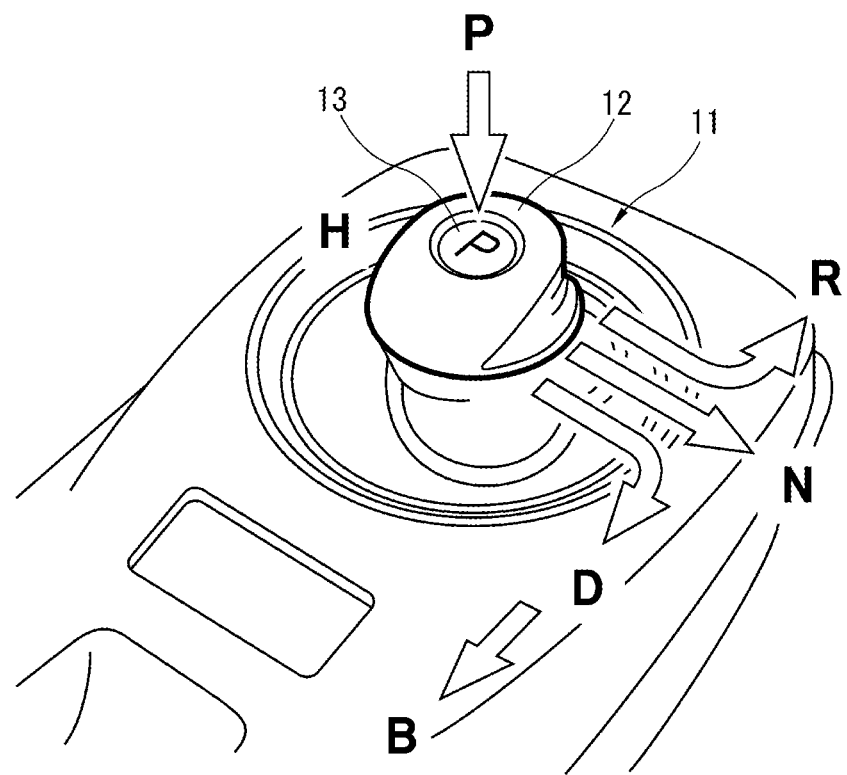
FIG. 2 is a perspective view showing an example of a range selector.

Near a driver's seat of the vehicle, a range selector 11 is provided for selecting traveling ranges of the vehicle. The range selector 11 is composed of a kind of electric switch for selecting range positions when a driver operates a shift lever 12 that stands upright. The vehicle of the embodiment is provided with a D-range (drive range) for normal forward traveling, a B-range (regenerative braking range) for causing relatively strong regenerative braking during deceleration, an R-range (reverse range) for rearward traveling, an N-range (neutral range) in which a driving force is prevented from being transmitted between the EV motor 1 and the driving wheels 5, and a P-range (parking range) for parking the vehicle. As directions of operation are shown by arrows in FIG. 2, when along a gate not shown the shift lever 12 is pulled toward a driver while being tilted to the right, the D-range is selected. When the shift lever 12 is further pulled, the B-range is selected. When along a gate not shown the shift lever 12 is pushed forward while being tilted to the right, the R-range is selected. When the shift lever 12 is tilted to the right for a certain period of time, the N-range is selected. The P-range is selected by pressing a P-range button 13 provided in a head of the shift lever 12.

Operated to swing in this way, the shift lever 12 has a home position (indicated by a reference numeral H in FIG. 2) in which the shift lever 12 stands almost vertically in the center, wherein the shift lever 12 is configured to mechanically return to the home position when forces of a palm and fingers are released after tilting in each direction. When in each range position described above, a corresponding switch is turned on. The switch is of a type performing so-called momentary operation. For example, regarding the N-range, an N-range signal indicating selection of the N-range is on, only while the shift lever 12 is tilted to the right.

The range signal outputted from the range selector 11 by momentary operation is inputted to the shift controller 8, wherein the shift controller 8 processes the range signal and determines which range the driver has selected. For example, selection of each range other than shifting from the D-range to the B-range is required be performed along with depression of a brake pedal not shown. Selection of the P-range requires a condition that the vehicle is completely stopped in addition to a condition that the brake pedal is depressed. As shown in FIG. 1, a brake signal and a vehicle speed signal are inputted to the shift controller 8 in order to determine whether the brake pedal is depressed and the vehicle is at rest. Near the range selector 11, a shift indicator 15 is provided for indicating a selected range position by lighting a small lamp, based on a signal (shift indicator output) outputted from the shift controller 8.

The shift controller 8 is connected via a communication network (for example, CAN communication) to the vehicle controller 2 that controls the EV motor 1 actually. As shown in FIG. 1, based on the input from the range selector 11, the shift controller 8 transmits a requested range signal to the vehicle controller 2. The vehicle controller 2 calculates a torque command to the EV motor 1 in a mode corresponding to the designated range position, based on the accelerator operation input described above. On the other hand, the vehicle controller 2 sends back to the shift controller 8 a vehicle actual range signal indicating the range position currently recognized by the vehicle controller 2. The shift controller 8 is configured to collate the requested range signal with the vehicle actual range signal, and thereby detect abnormality in a section related to these signals. The vehicle controller 2 also transmits to the shift controller 8 information on the accelerator operation input as accelerator operation information.

Furthermore, the current range position is outputted by the vehicle controller 2 and indicated at an appropriate position on a display 16 in front of the driver's seat. In the example of FIG. 1, it is indicated that it is currently in the P-range position. The display 16 includes not only an area for indication of the range position, but also an area of indication that is configured to indicate, by a character string or an image, guidance on N-range keeping operation, and that an N-range keeping mode is set, as detailed below. Near the driver's seat, a buzzer 18 is arranged for warning or informing acoustically, and is connected to the vehicle controller 2.

Furthermore, the vehicle controller 2 receives input of a signal from a starter switch 17 of a push button type. The starter switch 17 corresponds to a so-called key switch, and is used solely to perform key-on operation and key-off operation. This starter switch 17 is also of a momentary operation type, and outputs an on-signal only while being pressed. When the on-signal of the starter switch 17 is inputted when in the key-off state, the vehicle controller 2 determines that key-on operation (e.g., a vehicle system startup command) is performed, and when the on-signal of the starter switch 17 is inputted when in the key-on state, the vehicle controller 2 determines that key-off operation (e.g., a vehicle system shutdown command) is performed. In the following, "key on" may be also referred to as "ignition on" or "IGN ON", and "key off" may be also referred to as "ignition off" or "IGN OFF".

Figure 3:
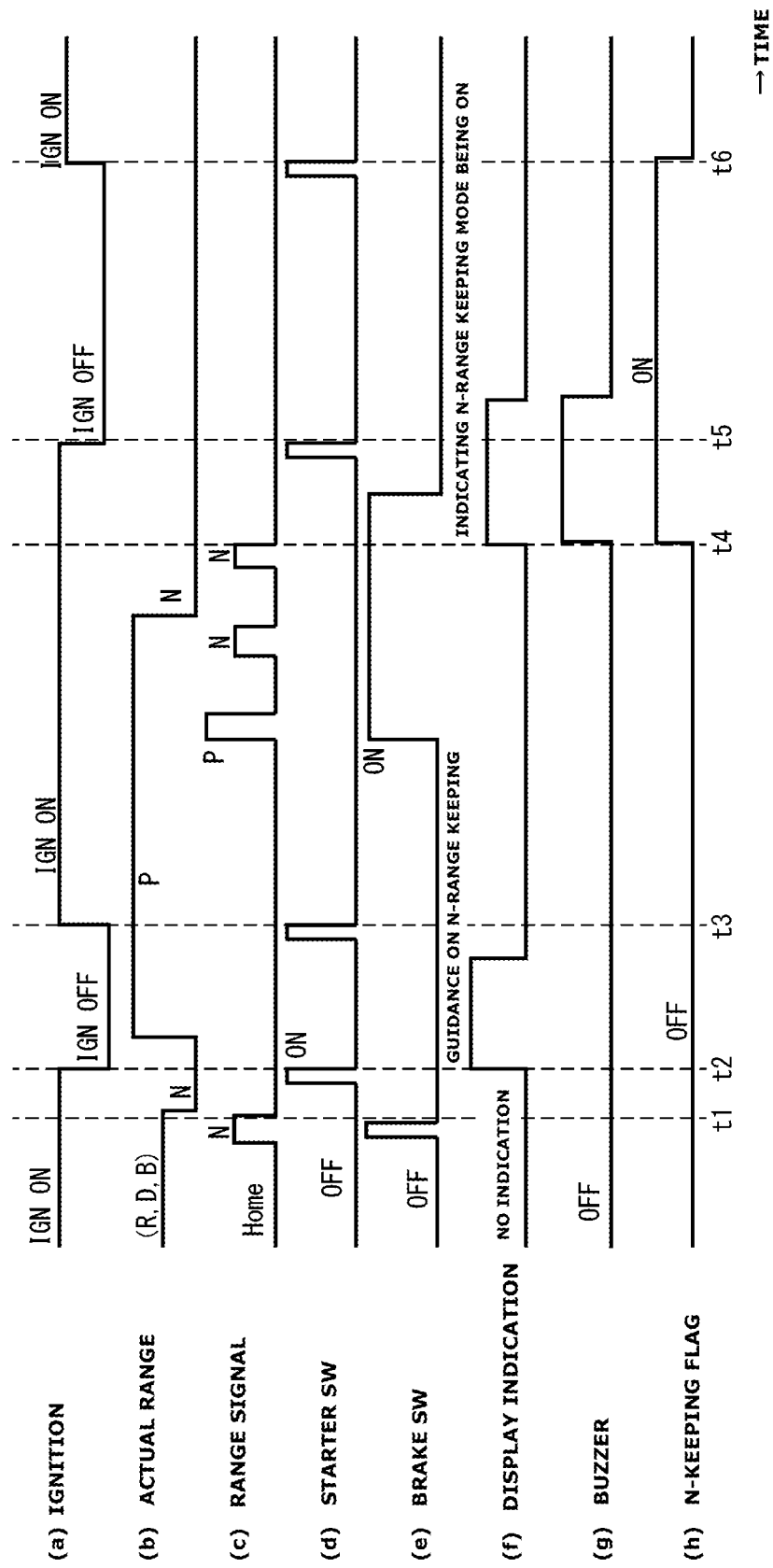
FIG. 3 is a time chart showing an example of behavior of the park lock control device.

FIG. 3 is a time chart showing an example of behavior of the park lock control device configured as described above. In order from the top are arranged (a) the on/off state of the ignition, (b) the actual range position, (c) the range signal outputted by the range selector 11, (d) the signal of the starter switch 17, (e) the brake signal, (f) the presence/absence of indication on the display 16, (g) the on/off state of the buzzer, and (h) the state of an N-range keeping flag.

This time chart starts under a condition where the ignition is on, and the vehicle is traveling in the D-range, B-range or R-range. The first half of the time chart shows behavior in which as a default setting, when the ignition is turned off while being in the N-range position, shifting into the P-range automatically occurs. Namely, when the traveling is finished, the brake signal is turned on, and the range signal to the N-range is inputted, the actual range position becomes the N-range at a time instant t1. Thereafter, when a driver presses the starter switch 17, the ignition is turned off at a time instant t2. At this time, the display 16 in front of the driver's seat indicates by a character string or an image that N-range keeping operation is possible which allows the vehicle to be parked without activation of the park lock mechanism 6, and indicates the guidance on the method of operation. For example, the N-range keeping mode is set by continuously operating the shift lever 12 of the range selector 11 as "P→N→N". The guidance for such an operation is indicated on the display 16.

When the driver ignores this guidance and leaves it as it is, the actual range position shifts from the N-range to the P-range according to the default setting. The shift into the P-range causes the park lock mechanism 6 to operate and lock the driving wheels 5. As a result, the vehicle is parked in the P-range with the park lock mechanism 6 activated. The guidance for the N-range keeping operation is presented until an appropriate time elapses, and then disappears. In one example, the guidance is set to disappear later than the shift to the P-range, in order to allow shifting to the N-range keeping mode even after the actual range position becomes the P-range and the park lock mechanism 6 is once activated.

Thereafter, when the driver presses the starter switch 17, the ignition is turned on at a time instant t3. After the time instant t3, the time chart shows setting operation of the N-range keeping mode. As shown in row (c), the N-range keeping mode is set by operating the shift lever 12 of the range selector 11 continuously as "P→N→N" while the vehicle is stopped, the ignition is on, and the brake signal is on. The shift controller 8 determines that such a continuous input is a request for setting the N-range keeping mode. Therefore, the N-range keeping flag shown in row (h) is turned on (at a time instant t4). Along with the setting of the N-range keeping mode, the display 16 indicates that the N-range keeping mode has been set, and the buzzer 18 sounds to warn the driver that the N-range keeping mode has been set. When the driver presses the starter switch 17 subsequent to operation of the shift lever 12, the ignition is turned off from the on-state at a time instant t5 as shown in row (a).

During the continuous operation of "P→N→N", the actual range position is shifted to the N-range by the first N-range signal, so that when the ignition is turned off (e.g., in response to the vehicle shutdown command), it is in the N-range position. At this time, the N-range keeping mode is set (namely, the N-range keeping flag is on), no automatic shifting to the P-range is performed. Accordingly, the park lock mechanism 6 also remains inactive. Therefore, it is possible to park the vehicle in the N-range where the vehicle can be slightly moved by human power. The indication on the display 16 and the sound of the buzzer 18 continue for an appropriate time from the ignition-off operation (e.g., the vehicle shutdown command), and then terminate. This is to prevent the driver from leaving the vehicle while misunderstanding that the park lock mechanism 6 is operating.

Thereafter, when the ignition is turned on by operation of the starter switch 17 at a time instant t6, the N-range keeping flag is basically turned off, namely, the N-range keeping mode is canceled. However, it is possible to customize the setting of the vehicle so that the N-range keeping mode once set is not canceled by the next ignition-on operation. When this customized setting is active, the range keeping mode is not released by ignition-on operation. For example, when the shift lever 12 is continuously operated as "P→N→N", by outputting the last N-range signal for a long time (namely, holding the shift lever 12 at the N-range position for a predetermined time), the N-range keeping mode is customized and is not canceled by subsequent ignition-on operation. The customized setting of the N-range keeping mode is canceled when the driver operates the shift lever 12 into the P-range (actually, pressing the button 13 for the P-range).

Figure 4:
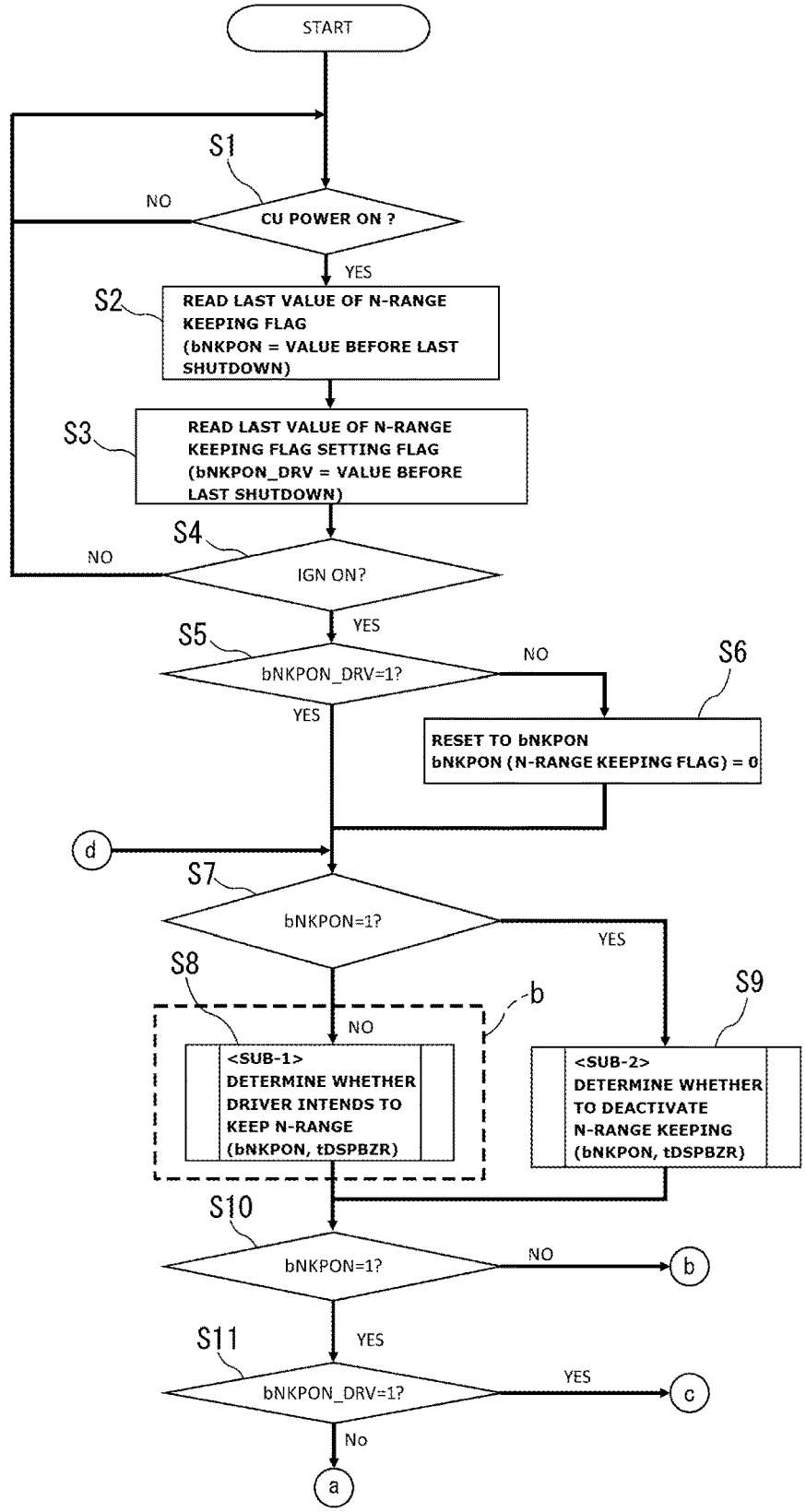
FIG. 4 is a main flowchart showing a flow of control of the park lock control device.
Figure 5:
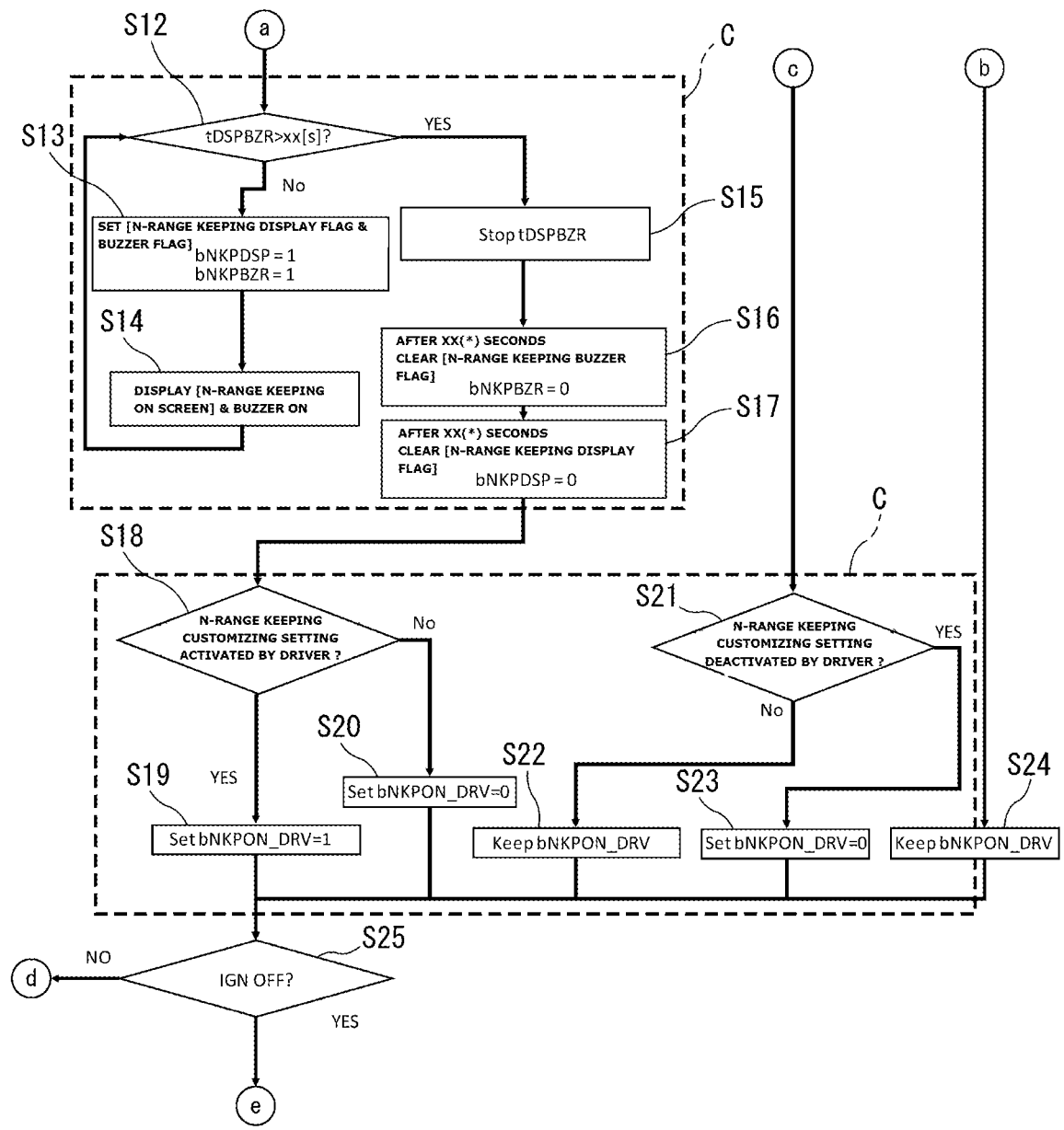
FIG. 5 is a main flowchart subsequent to FIG. 4.
Figure 6:
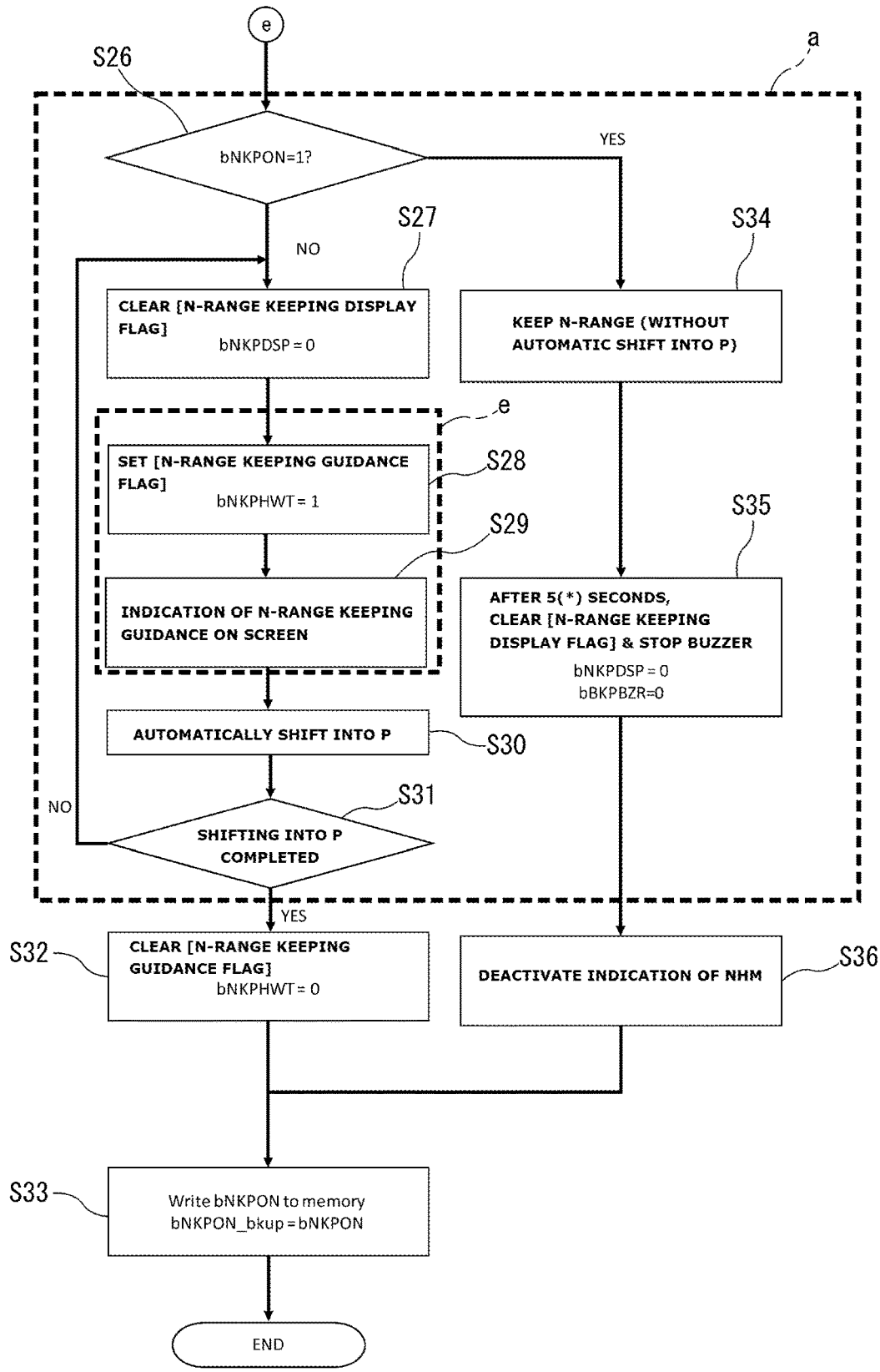
FIG. 6 is a main flowchart subsequent to FIG. 5.

The following describes a control process according to one embodiment with reference to flowcharts shown in FIGS. 4 to 8. FIGS. 4 to 6 show a main flowchart divided into three, and the main flowchart is repeatedly executed by the shift controller 8 at predetermined calculation cycles, for example. Symbols used in the drawings are as follows.
  bNKPON: N-range keeping flag,
  bNKPON_bkup: N-range keeping flag Last trip value,
  bNKPDSP: N-range keeping display flag,
  bNKPBZR: N-range keeping buzzer flag,
  bNKPHWT: N-range keeping guidance flag,
  bNKPON_DRV: N-range keeping customization setting flag,
  tDSPBZR: Display-buzzer timer, and
  tNKPTIMER: N-range keeping determination permission timer.

In FIG. 4, at Step 1 (each step is abbreviated as S1 etc. in the drawings), it is determined whether the controllers and others including the vehicle controller 2 and the shift controller 8 are energized. The controllers are energized, for example, when a door is released from locking or the door is opened. When the controllers are energized, the process proceeds to Step 2 where the last value of the N-range keeping flag is read (namely, bNKPON=bNKPON_bkup), and further proceeds to Step 3 where the last value of the N-range keeping customization setting flag is read (namely, bNKPON_DRV is set to a value immediately before the last shutdown). Next, at Step 4, it is determined whether the ignition is on. When the ignition is not on, the process returns to Step 1.

When the ignition is on, the process proceeds to Step 5 where it is determined whether the N-range keeping customization setting flag is equal to 1. When the N-range keeping customization setting flag is not equal to 1, the process proceeds to Step 6 where the N-range keeping flag is reset to 0. Thereby, the N-range keeping mode is to be canceled when the ignition is turned on, as described above.

When the N-range keeping customization setting flag is equal to 1, it is determined at Step 7 whether the N-range keeping flag at this moment is equal to 1. When the N-range keeping flag is equal to 0, the process proceeds to a subroutine of Step 8. When the N-range keeping flag is equal to 1, the process proceeds to a subroutine of Step 9. The subroutine of Step 8 is a process of determining whether the driver intends to keep the N-range. The subroutine of Step 9 is a process of determining the necessity of canceling the N-range keeping. These subroutines are detailed below.

At Step 10, it is determined whether the N-range keeping flag is equal to 1 after the subroutines. When the N-range keeping flag is equal to 1, the process proceeds to Step 11. When the N-range keeping flag is equal to 0, the process proceeds to Step 24 in FIG. 5.

At Step 11, it is determined whether the N-range keeping customization setting flag is equal to 1. When the N-range keeping customization setting flag is already set to 1, the process proceeds to Step 21 in FIG. 5. When the N-range keeping customization setting flag is equal to 0, the process proceeds to Step 12 in FIG. 5.

At Step 12, it is determined whether a count value of the display-buzzer timer exceeds a predetermined time (xx seconds). In case of NO, at Step 13, the N-range keeping display flag and the N-range keeping buzzer flag are set to 1. Then, at Step 14, the display 16 is caused to indicate that the N-range keeping mode is set, and the buzzer 18 is caused to sound.

When the count value of the display-buzzer timer exceeds the predetermined time (xx seconds) at Step 12, the process proceeds to Step 15 where the display-buzzer timer is stopped, and proceeds to Steps 16 and 17 where the N-range keeping display flag and the N-range keeping flag are set to 0. Thereby, the indication on the display 16 and the buzzer 18 are stopped. The predetermined time (xx seconds) is changeable and appropriately set. The indication on the display 16 and the warning by the buzzer 18 may be configured to continue while the ignition is on.

Subsequently, at Step 18, it is determined whether or not the driver has performed the customization setting operation of the N-range keeping. As an example of the customization setting operation of the N-range keeping, when the shift lever 12 is operated continuously as "P→N→N", the last N-range signal is outputted for a long time (namely, the shift lever 12 is held at the N-range position for a predetermined time). Naturally, the customization setting operation may be implemented by a specific operation other than this example.

When the customization setting operation is performed, the process proceeds from Step 18 to Step 19 where the N-range keeping customization setting flag is set to 1. When no customization setting operation is performed, the process proceeds from Step 18 to Step 20 where the N-range keeping customization setting flag is set to 0.

On the other hand, when the N-range keeping customization setting flag is already set to 1 at Step 11 described above, the process proceeds from Step 11 to Step 21 where it is determined whether or not the driver has canceled the N-range keeping customization setting. For example, pressing the P-range button 13 of the shift lever 12 is an example of operation of cancelling the N-range keeping customization setting. Naturally, the operation of cancellation of the customization setting may be implemented by a specific operation other than this example.

When no cancellation operation of the customization setting is performed, the process proceeds from Step 21 to Step 22 where the N-range keeping customization setting flag is maintained at 1. When the operation to cancel the customization setting is performed, the process proceeds from Step 21 to Step 23 where the N-range keeping customization setting flag is set to 0.

When the N-range keeping flag is equal to 0 at Step 10 described above, the process proceeds to Step 24 where the N-range keeping customization setting flag at the moment is held.

After processing the N-range keeping customization setting flag at Steps 19, 20, 22, 23, and 24, the process proceeds to Step 25 where it is determined whether the ignition is off. In case of NO, the process returns to Step 7. Accordingly, the process of Steps 7 to 25 is basically repeated from ignition-on operation to ignition-off operation.

When it is determined at Step 25 that the ignition is off, the process proceeds to Step 26 where it is determined whether or not the N-range keeping flag is equal to 1. When the N-range keeping flag is equal to 0, the process proceeds to Step 27 where the N-range keeping display flag is set to 0. Subsequently, the N-range keeping guidance flag is set to 1, and based on this flag, the guidance for setting the N-range keeping mode is indicated on the display 16 (Steps 28 and 29). Namely, for example, the driver is informed that the N-range keeping mode can be set by the operation of "P→N→N".

Next, the process proceeds to Step 30 where automatic shifting to the P-range is performed, and proceeds to Step 31 where it is determined whether or not the shifting to the P-range is completed. When it is determined that the shifting to the P-range is completed, the process proceeds to Step 32 where the N-range keeping guidance flag is set to 0. Accordingly, the indication of the guidance on the display 16 terminates. As described above, the indication of the N-range keeping guidance may be configured to continue for a while after the shift to the P-range. With the shift to the P-range, the park lock mechanism 6 is activated.

Finally, at Step 33, the value of the N-range keeping flag at that time is stored as the N-range keeping flag previous trip value (bNKPON_bkup), and the overall process is terminated.

On the other hand, when the N-range keeping flag is equal to 1 at Step 26, the process proceeds to Step 34 where the N-range is maintained without automatic shift to the P-range. Namely, the N-range is maintained without activation of the park lock mechanism 6. Then, at Step 35, the N-range keeping display flag and the N-range keeping buzzer flag are set to 0 after a predetermined time has elapsed from the ignition-off operation (for example, 5 seconds later). Thereby, the indication that the N-range keeping mode is set and the buzzer 18 are stopped (Step 36). Namely, when the ignition is turned off while the N-range position is maintained in the N-range keeping mode, the indication that the N-range keeping mode is set and the buzzer 18 are stopped 5 seconds after the ignition is turned off. Finally, at Step 33, the value of the N-range keeping flag at that time is stored as the N-range keeping flag previous trip value (bNKPON_bkup), and the overall process is terminated.

Figure 7:
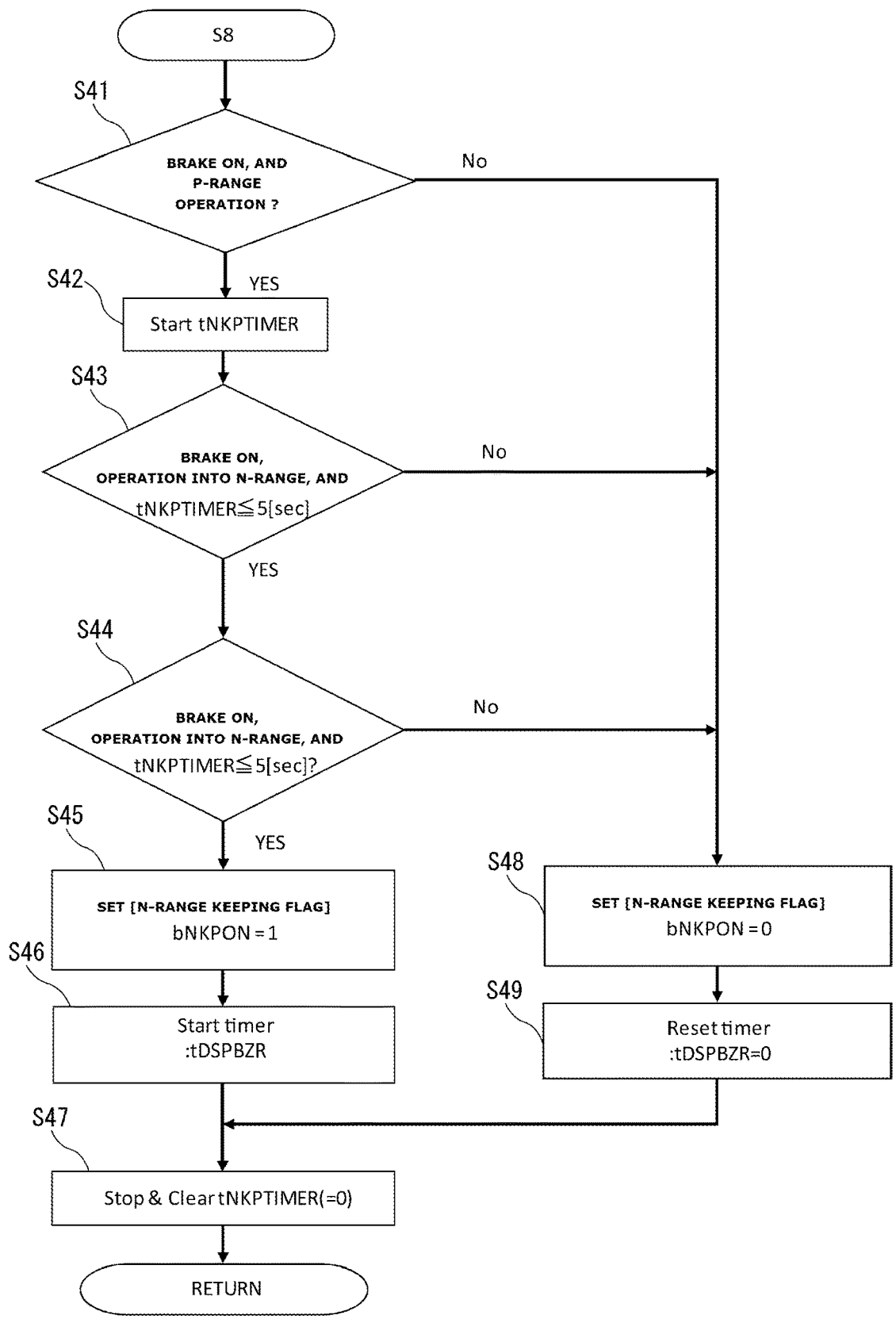
FIG. 7 is a flowchart showing a subroutine of determining whether a driver intends to keep an N-range.

The following describes the subroutine of Step 8 with reference to FIG. 7. This subroutine is a process of determining driver's intention to keep the N-range when the N-range keeping flag is equal to 0 at Step 7. At Step 41, it is determined whether the brake signal is on and the P-range signal is on. This corresponds to the first operation to the "P-range" in the series of operations "P→N→N" according to the embodiment.

When the determination at Step 41 is YES, the process proceeds to Step 42 where counting of the N-range keeping determination permission timer is started.

Next, the process proceeds to Step 43 where it is determined whether the brake signal is on, the N-range signal is on, and the count value of the N-range keeping determination permission timer is less than or equal to a predetermined time (for example, 5 seconds). This corresponds to determination as to whether or not the first operation to the "N-range" in the series of operations of "P→N→N" is performed within 5 seconds from the operation to the P-range.

When the determination at Step 43 is YES, the process proceeds to Step 44 where it is determined whether the brake signal is on, the N-range signal is on, and the count value of the N-range keeping determination permission timer is less than or equal to a predetermined time (for example, 5 seconds). This corresponds to determination as to whether or not the second operation to the "N-range" in the series of operations of "P→N→N" is performed within 5 seconds from the operation to the P-range.

When the determination at Step 44 is YES, it means that the operation of "P→N→N" is continuously executed within 5 seconds as a whole, and the process proceeds to Step 45 where the N-range keeping flag is set to 1. Then, at Step 46, counting of the display-buzzer timer is started. The processing of Step 12 and others described above is performed based on the count value of this display-buzzer timer.

On the other hand, when any of the determination at Step 41, Step 43, and Step 44 is NO, the process proceeds to Step 48 where the N-range keeping flag is set to 0. Then, at Step 49, the value of the display-buzzer timer is reset to 0.

Finally, at Step 47, the N-range keeping determination permission timer is stopped, the count value thereof is reset to 0, and the subroutine is terminated.

Figure 8:
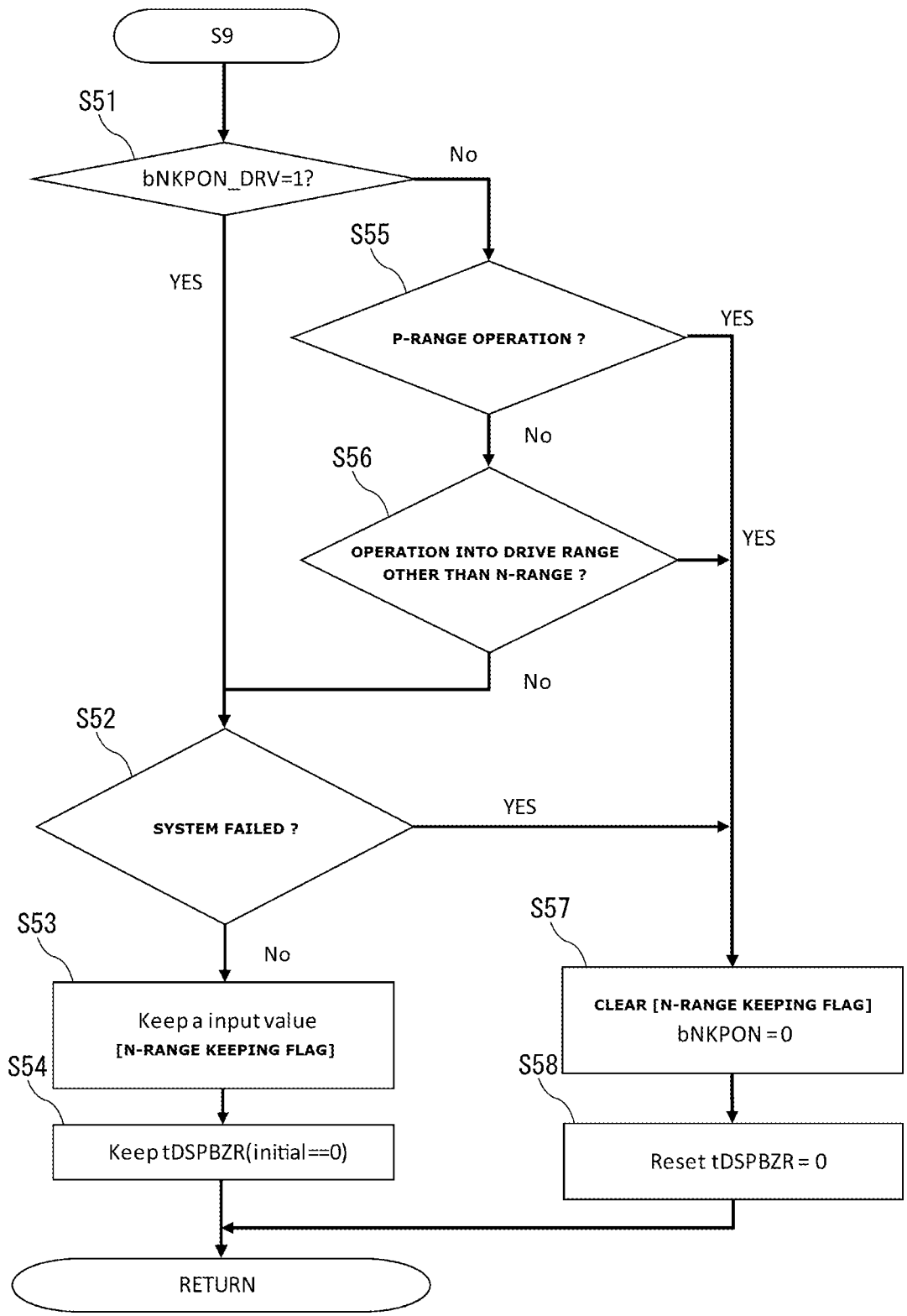
FIG. 8 is a flowchart showing a subroutine of determining whether to cancel N-range keeping.

The following describes the subroutine of Step 9 with reference to FIG. 8. This subroutine is a process of determining whether or not it is required to cancel the N-range keeping when the N-range keeping flag is equal to 1 at Step 7. At Step 51, it is determined whether the N-range keeping customization setting flag is equal to 1. When the N-range keeping customization setting flag is equal to 1, namely, when the customized setting indicates employment of the N-range keeping mode, it is determined at Step 52 whether the system is failed (for example, shifting to the P-range cannot be performed, the range signal is abnormal, the voltage drops, etc.). Unless a system failure is detected, the process proceeds to Step 53 where the value of the N-range keeping flag is held as it is. In other words, the N-range keeping flag remains to be equal to 1. Then, the count value of the display-buzzer timer is held as it is (Step 54).

When the N-range keeping customization setting flag is equal to 0 at Step 51, the process proceeds to Step 55 where it is determined whether or not the P-range operation (the operation of pressing the P-range button 13) is performed. In case of NO, the process further proceeds to Step 56 where it is determined whether or not operation has been made to a traveling range other than the N-range (in this embodiment, this traveling range corresponds to the D-range, the B-range, and the R-range). In case of NO at Step 56, the process proceeds to Step 52 for the operation described above.

In case of YES at Step 55 or Step 56, the process proceeds to Step 57 where the N-range keeping flag is reset to 0. Then, the display-buzzer timer is reset to 0.

By the above processing, as described with reference to FIG. 3, by the default setting in which the N-range keeping mode is not set, when the vehicle is stopped in the N-range position and the ignition is turned off, the P-range is automatically set to operate the park lock mechanism 6. At this time, on the display 16, the guidance on the possibility of setting the N-range keeping mode and the method thereof is indicated. Simultaneously, this guidance also informs the driver that the ignition is turned off by the driver when in the N-range instead of the P-range.

Furthermore, when the vehicle is stopped in the N-range position and the shift lever 12 is continuously moved by a predetermined operation such as "P→N→N" within 5 seconds, the N-range keeping mode is set to allow parking in the N-range. Namely, the park lock mechanism 6 is not activated even when the ignition is turned off. At this time, the indication on the display 16 and the buzzer 18 warn that the N-range keeping mode is set, namely, the park lock mechanism 6 is not operating.

Furthermore, by performing a predetermined operation such as pressing and holding the P-range button 13 for a long time, the N-range keeping mode can be set as a customized setting of the vehicle, and the N-range keeping mode is not canceled at the next ignition-on operation. It is convenient for users who want to always keep the N-range when parking, because the customized setting of the vehicle serves to eliminate the necessity of each operation of setting the N-range keeping mode.

In the main flowchart, the process of Steps 26 to 31 surrounded by a broken line a corresponds to claim 1, the subroutine of Step 8 surrounded by a broken line b corresponds to claim 2, and the process of Steps 18 to 25 surrounded by a broken line c corresponds to claim 4, and the process of Steps 12 to 17 surrounded by a broken line d corresponds to claim 5.

Although one embodiment in which the present invention is applied to an electric vehicle has been described in detail above, the present invention is not limited to electric vehicles, but may be applied widely to vehicles each having an internal combustion engine as a drive source, or hybrid vehicles each having an internal combustion engine and an electric motor as a drive source. Furthermore, the range selector and the ignition key switch are not limited to the types of the above-described embodiment, but may be of any publicly known type.

Furthermore, in the above embodiment, the existing shift lever 12 is used for the N-range keeping mode setting, the vehicle customization setting, and cancellation of the vehicle customization setting. However, naturally, dedicated switches or the like may be provided. The setting operation of the N-range keeping mode may be implemented not only by the above-mentioned operation "P→N→N", but also may be implemented variously with existing devices, for example, by shifting to the N-range while depressing the brake with no driving torque generated, and thereafter holding accelerator operation for a certain period of time. The same applies to the vehicle customization setting and its cancellation.

The invention claimed is:

1. A vehicle park lock control method for a vehicle with a range selector provided for selecting range positions including a P-range position and an N-range position in each of which a driving force is prevented from being transmitted to a driving wheel of the vehicle, wherein the range selector includes a range selector lever arranged to be mechanically returned to a home position, wherein a park lock mechanism is activated when the P-range position is selected by the range selector, the vehicle park lock control method comprising:
   providing the range selector for an operator to selectively shift to cause the park lock mechanism to be activated in response to a vehicle system shutdown command when in the N-range position;
   providing an N-range keeping mode configured to, in response to activation thereof, prevent the park lock mechanism from being activated in response to the vehicle system shutdown command when in the N-range position, wherein the N-range keeping mode is activatable by a predetermined N-range keeping operation of the operator;
   in response to the vehicle system shutdown command when in the N-range position without the N-range keeping mode activated, displaying guidance on the N-range keeping operation on a display of the vehicle; and
   implementing the N-range keeping operation by shifting the range selector lever by a predetermined pattern from the home position to (i) a range position other than the N-range position and (ii) the N-range position.

2. The vehicle park lock control method as claimed in claim 1, comprising:
   deactivating the N-range keeping mode in response to a next vehicle system startup command.

3. The vehicle park lock control method as claimed in claim 2, comprising:
   in response to a predetermined setting operation of the operator, establishing a vehicle customizing setting to prevent the N-range keeping mode from being deactivated in response to the next vehicle system startup command.

4. The vehicle park lock control method as claimed in claim 1, comprising:
   in response to selection of the N-range keeping mode, informing the operator of the selection of the N-range keeping mode visually or acoustically.

5. A vehicle park lock control device comprising:
   a range selector provided with range positions including a P-range position and an N-range position in each of which a driving force is prevented from being transmitted to a driving wheel of a vehicle; and
   a park lock mechanism structured to lock at least one road wheel;
   wherein the range selector includes a range selector lever arranged to be mechanically returned to a home position;
   wherein the park lock mechanism is activated when in the P-range position;
   wherein an operator is allowed to select whether or not to cause the park lock mechanism to be activated in response to a vehicle system shutdown command when in the N-range position;
   wherein an N-range keeping mode is activated by a predetermined N-range keeping operation of the operator;
   wherein the vehicle park lock control device comprises a controller configured to, in response to the vehicle system shutdown command when in the N-range position without the N-range keeping mode activated, cause guidance on the N-range keeping operation to be displayed on a display of the vehicle; and wherein the N-range keeping operation is implemented by shifting the range selector lever by a predetermined pattern from the home position to (i) a range position other than the N-range position and (ii) the N-range position.

\* \* \* \* \*